(No Model.)  3 Sheets—Sheet 1.

H. P. WHITE.
COMMUTATOR.

No. 550,703.  Patented Dec. 3, 1895.

Witnesses:
Walter S. Wood
Marian Longyear

Inventor,
Henry P. White
By Fred L. Chappell
Att'y.

(No Model.) 3 Sheets—Sheet 2.

H. P. WHITE.
COMMUTATOR.

No. 550,703. Patented Dec. 3, 1895.

Witnesses:
Walter S. Wood
Marian Longyear

Inventor,
Henry P. White
By Fred L. Chappell
Att'y.

(No Model.)  H. P. WHITE.  3 Sheets—Sheet 3.
COMMUTATOR.

No. 550,703.  Patented Dec. 3, 1895.

Witnesses:  
Watter S. Wood  
Marian Longyear.

Inventor,  
Henry P. White  
By Fred L. Chappell  
Att'y.

UNITED STATES PATENT OFFICE.

HENRY P. WHITE, OF KALAMAZOO, MICHIGAN, ASSIGNOR OF THREE-FOURTHS TO CHARLES D. FULLER, OF SAME PLACE.

COMMUTATOR.

SPECIFICATION forming part of Letters Patent No. 550,703, dated December 3, 1895.

Application filed January 29, 1895. Serial No. 536,536. (No model.)

*To all whom it may concern:*

Be it known that I, HENRY P. WHITE, a citizen of the United States, residing at the city of Kalamazoo, in the county of Kalamazoo and State of Michigan, have invented certain new and useful Improvements in Electric Commutators, of which the following is a specification.

My invention relates to improvements in electric commutators.

The objects of my invention are, first, to provide an improved commutator which will utilize and convert at one and the same time two or more separate alternating currents into a direct current or will take a direct current and separate it into two or even more separate alternating currents; second, to provide a commutator that will take two or more direct currents and change them into an alternating current; third, to provide a commutator which by a slight adjustment of its brushes will vary the intensity of a direct current or an alternating current which it may be commutating; fourth, to provide a commutator which will be of value in use in electrical machines, such as motors or dynamo-electric machines and any machines of like character, by causing a current to act consecutively through a series of armature heads and fields, thus lessening the intervals of the impulses due to the current or increasing the power or increasing the frequency of the impulses of the generation, as the case may be. I accomplish these objects of my invention by the devices shown in the accompanying drawings, in which—

Figure 1:
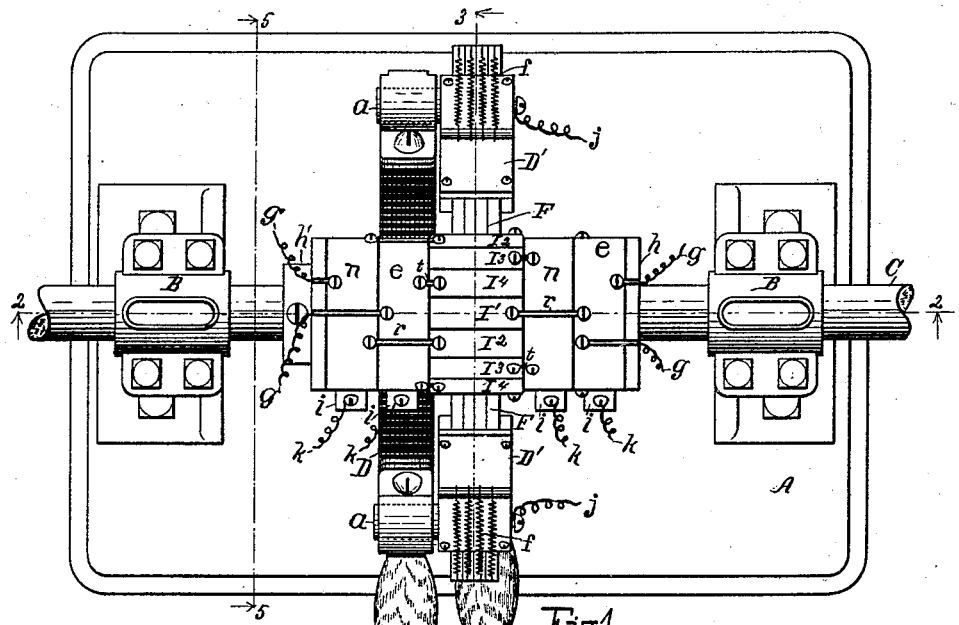
Figure 2:
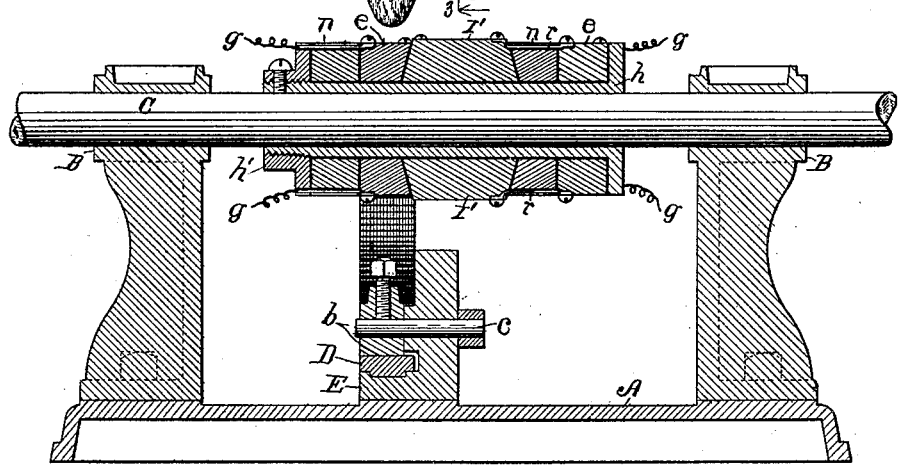
Figure 3:
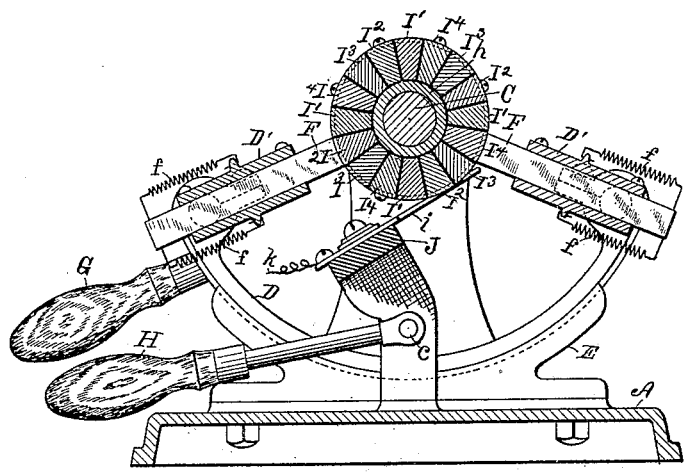
Figure 4:
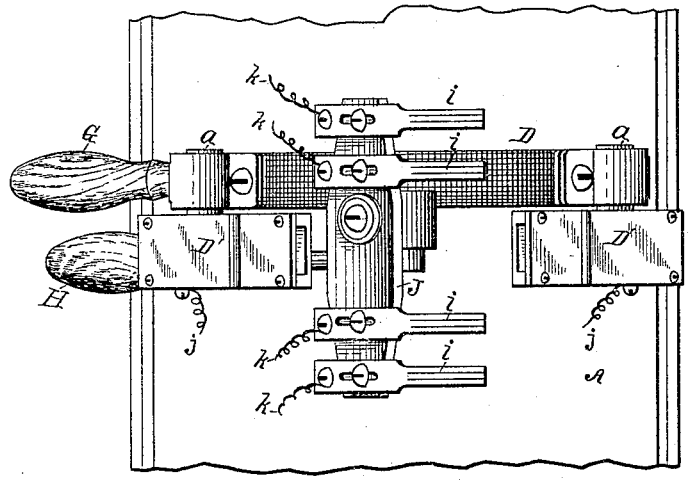
Figure 5:
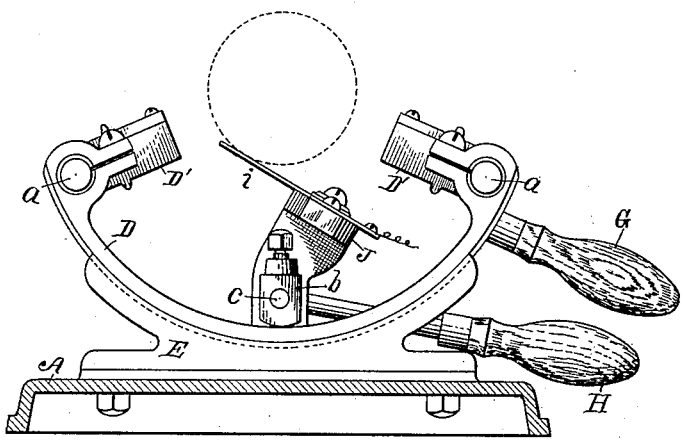
Figure 6:
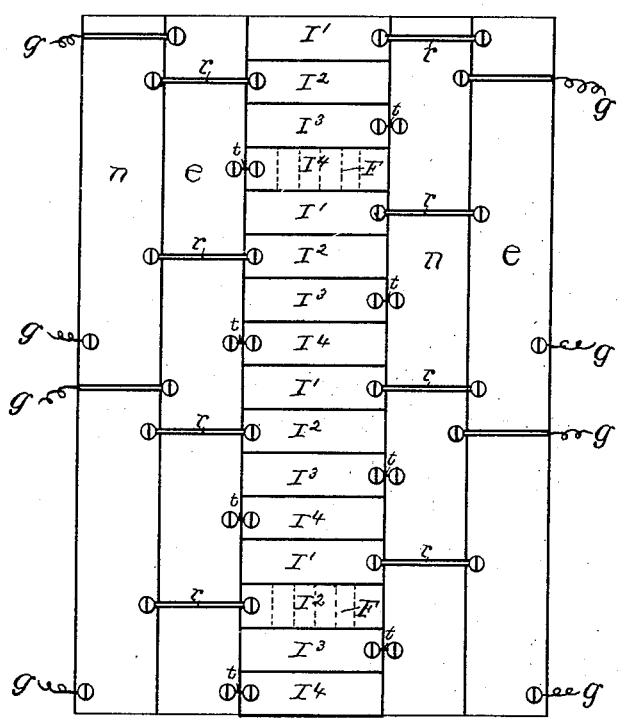

Figure 1 presents a top plan view of a commutator embodying the features of my invention. Fig. 2 is a sectional view on line 2 2 of Fig. 1. Fig. 3 is also a sectional view on line 3 3 of Fig. 1. Fig. 4 presents a top plan detail view of the commutator-brushes and brush-holders, the central brushes being removed. Fig. 5 presents a sectional view on line 5 5 of Figs. 1 and 4, the commutator shaft and segments being shown by a dotted line, the central brushes being still removed. Fig. 6 is a detail diagrammatic view showing the details of wiring of the commutator, it being a view similar to the periphery of the commutator were it unrolled and extended.

In the drawings all of the sectional views are taken looking in the direction of the little arrows at the ends of the section-lines.

Similar letters of reference refer to similar parts throughout the several views.

Referring to the lettered parts of the drawings, A represents the base.

B B represent the brackets containing the bearings for the shaft.

C is the shaft on which the commutator rings and segments are located.

E represents a saddle, which supports the segment of a ring D, which carries the brush-holders and is made so that the brush-holders can be properly adjusted to bring the brushes in the right relation to the commutator. The ring-segment D is in a circle having the center of shaft C as its center and is adjusted by means of the cam $b$, which is on the pin $c$ and is operated by the handle H. Brush-holders D' are at each end of this segment D and are properly insulated.

The commutator is made up of central segment portions $I'$ $I^2$ $I^3$ $I^4$, there being four sets, or sixteen in all, shown in this device. Any even number greater than four can be used. Commutator-rings $n\, n$ and $e\, e$ are situated to each side of the segment portions. These segment portions and rings are supported on a central sleeve $h$, which has a shoulder at one end and a screw-cap $h'$ at the other for clamping them together. The central segment portions are made wedge-shaped, with the longest sides toward the center, the base of the wedge being placed toward the center of the shaft and resting on a suitable insulation on the sleeve $h$. The commutator-segments are also wedge-shaped in the opposite direction, owing to the fact that they fit in as the segments of a circle, the sides being formed by radial planes. The right-hand commutator-ring $n$ and the left-hand commutator-ring $e$ are hollowed out toward the center to receive the wedge-shaped sides of the commutator-sections I to retain them in place. The rings, the commutator-segments, and the rings again are all placed upon the sleeve $h$, which is suitably insulated therefrom, and are clamped together by the screw-cap $h'$, being screwed upon the sleeve. A suitable insulation is placed between the rings and segment portions, consisting, preferably, of sheets of mica. The brushes F F are placed in the brush-holders D' D' and held surely against the segment portions of the commutator by the springs $f f$ to each side. The segment portions of the commutator are marked I' I² I³ I⁴ alternately around the periphery of the commutator, and the brushes F F are so situated as to rest on the two segments I' and I³ or I² and I⁴, as the case may be. The segments are connected to the rings $n$ and $e$ alternately, (see Fig. 6,) where the first segment I', which is at the top of the drawing, is connected to the right-hand ring $e$. The next segment I² is connected to the left-hand ring $n$. The next segment I³ is connected to the right-hand ring $n$. The next segment I⁴ is connected to the left-hand ring $e$, and so on, the connection to the outer ring being marked $r$ and to the inner rings being marked $t$. Suitable connections $g g g g$, &c., lead off from the rings to the outside. Where it is necessary for the wires that connect the segments or rings together to pass over an intervening ring, they are of course sunk into suitable recesses and insulated from the ring which they cross. This is necessary where it is desired to put brushes upon the ring which is crossed. Otherwise it will not be necessary to sink the connection and insulate the same, as it can be brought outside, and it will then interfere with nothing.

In the construction of my commutator it will be found necessary to have at least two commutator-segments for each pair of rings—that is, two pairs of segments for a pair of rings—in order that the positive segment and negative segment or the positive ring and the negative ring in each instance may have an independent alternate connection.

To make the commutator complete and successful, at least two pairs of rings must be used. The central brushes shall be of such width that they can each rest upon a number of commutator-segments, equal only to the number of pairs of rings. By so constructing the commutator the full effect of the current delivered will be imparted to all the rings or will be taken from all the rings to the central segments of the commutator, as the case may be. I desire to state, however, that a continuous current will be produced if the brushes rest on the outer segments of the commutator if each brush is of sufficient width to rest upon two of the central segments at the same time. This, it is believed, will give the general rule for constructing a commutator to accomplish the results which I here secure—that is, the result of delivering all of the rings to the center segments in a continuous current or imparting a continuous flow of the current from the center segments to the rings, as the case may be.

Having thus described my improved commutator in detail, I desire to state that it can be considerably varied in its details and that the same can be greatly extended without departing from my invention. Either four, six, eight, ten, or, in fact, any number of pairs of rings greater than two can be used upon my improved commutator, the segment portions I' I, &c., being made to correspond and being connected with the rings successively and alternately in order to produce the desired result of delivering numerous alternating currents and commutating them into a single direct current or dividing the single direct current up into alternating currents.

Pairs of rings not electrically connected with the center segments of the commutator may be provided at one or both ends of said commutator to accommodate any work which might be in mechanical connection with the commutator but not on the same electric circuits as the center segments of said commutator.

The working qualities of my device will not be affected by the method of placing and attaching the rings and segments of the commutator, it being immaterial whether the rings are equally or unequally divided between each end of the commutator or all placed on one end, although the method I have shown is simple and is much preferred by me on that account.

The brushes F on the center segments of the commutator are adjustable by adjusting the segment of the ring D, as will be readily understood, and this is a valuable feature of the commutator for use in a motor or generator, as by simply adjusting the brushes F F and changing their relations to the field-magnets of such machines the intensity of the current can be varied in case of a generator, or the speed and power of the motor can be governed, and this will have its effect in permitting an adjustment of the commutator properly to commutate alternating currents by getting the brushes in the right position to begin with the impulses of the current, which will also be readily understood. The machine can be reversed by changing the position of the brushes in this way if it is a motor, and the current can be reversed in a generator in the same way.

I desire to state that my improved commutator is available for use under a variety of circumstances—for instance, in delivering currents to electric motors or in taking currents from dynamo-electric machines, an instance of which is shown in an application for a patent bearing even date herewith, Serial No. 536,535, in which the generator is constructed and specially adapted for use in connection with this particular commutator. The commutator will also be valuable for changing direct continuous currents into alternating currents or alternating into direct currents whenever such changes may be required.

Having thus described my invention, what I claim as new, and desire to secure by Letters Patent, is—

1. In a commutator, the combination of the central shaft; two pairs of rings, $e$, $n$, each pair of which is independent from the other and connected to independent sources, each ring being insulated from the other; segment pieces, I', I², I³, I⁴, connected successively and alternately with said rings, there being at least a segment for each ring; brushes, i, i, to rest on said rings; and brushes, F, F, to rest on the segments, I', I², &c., and suitable connections to said brushes an appropriate distance apart to commutate and deliver a current to the rings or the segments either or both as desired, for the purpose specified.

2. In a commutator, the combination of the central shaft; two pairs of rings, e, n, each pair of which is independent in its connections and each ring of which is insulated from the other; segment pieces, I', I², I³, I⁴, connected successively and alternately with said rings, there being at least a segment for each ring; brushes, i, i, to rest on said rings; and adjustable brushes, F, F, to rest on the segments, I', I², &c., and suitable connections to said brushes an appropriate distance apart to commutate and deliver a current to the rings or the segments either or both as desired, for the purpose specified.

3. In a commutator, the combination of the central shaft; two pairs of rings, e, n, each pair of which is independently connected and each ring of which is insulated from the other; segment pieces, I', I², I³, I⁴, connected successively and alternately with said rings, there being at least a segment for each ring; brushes, i, i, to rest on said rings; a curved segment, D, resting on the saddle, E, the center of the curve being the center of the commutator shaft; brushes, F, F, supported on the ends of said curved segment to rest on the segments, I', I², &c., of the commutator; and a suitable clamp for clamping the segment ring, D, in place to make the brushes adjustable; and suitable connections to said brushes an appropriate distance apart to commutate and deliver a current to the rings or the segments either or both as desired, for the purpose specified.

4. In a commutator, the combination of the central shaft; of pairs of rings, e, n, each pair of which is independently connected and each ring of which is insulated from the other; segment pieces, I', I², &c., connected successively and alternately in series with said rings there being at least a segment for each ring and connected alternately and successively in series therewith; brushes on said rings; and brushes to rest on the segments, I', I², &c., and suitable connections to said brushes to commutate and deliver a current from either the rings or segments or both as desired, for the purpose specified.

5. In a commutator, the combination of the central shaft; of pairs of rings, e, n, each pair of which is independently connected and each ring of which is insulated from the other; segment pieces, I', I², &c., connected successively and alternately with said rings, there being an equal number of segments for each ring, and connected alternately and successively in series therewith; brushes to rest on said rings; and brushes to rest on said segments, I', I², &c., of a width and size sufficient to engage two of the segments at once; and consequently rest at all times on at least one segment; and suitable connections to said brushes and to said segments to commutate and deliver a current from either the rings or the segments or both as desired, for the purpose specified.

6. In a commutator, the combination of the central shaft; of pairs of rings, e, n, each pair of which is independently connected and each ring of which is insulated from the other, the rings of each pair being for opposite ends of an electric circuit; segment pieces, I', I², &c., connected successively and alternately in series with said rings, there being an equal number of segments for each pair of rings; brushes to rest on said segments, I', I², &c.; and suitable connections to said brushes to commutate and deliver a current from the rings through the segments or vice versa as desired, for the purpose specified.

7. In a commutator, the combination of conductor members in pairs, each pair of which is independently connected and each member of which is insulated from the other, a member of each pair permanently connected in opposite ends of an electric circuit, an equal number of commutator sections to each member connected with said members alternately and successively; brushes for traversing the commutator sections to commutate a current either to or from the electric circuits, as desired.

8. In a commutator, the combination of conductor members in pairs, each pair of which is independently connected and each member of which is insulated from the other, a member of each pair permanently connected in opposite ends of an electric circuit, an equal number of commutator sections to each member connected with said member alternately and successively; adjustable brushes for traversing the commutator sections to commutate a current either to or from the electric circuits, as desired.

9. In a commutator, the combination with a suitable shaft, of conductor members in pairs, each pair of which is independently connected and each member of which is insulated from the other, a member of each pair permanently connected in opposite ends of an electric circuit, an equal number of commutator sections to each member connected with said members alternately and successively; a curved segment resting in a saddle under the segments of the commutator; and brushes supported on the ends of said segment to rest on the central portions of the commutator; a suitable clamp for clamping the curved segment so that the brushes can be adjusted together for traversing the commutator sections to commutate the current either to or from the electric circuits, as desired.

10. In a commutator, the combination of conductor members in pairs, each pair of which is independently connected and each member of which is insulated from the other, a member of each pair permanently connected in the opposite ends of an electric circuit; an equal number of commutator sections to each member connected with said members alternately and successively; brushes for traversing the commutator sections successively to commutate the current either to or from the electric circuits of sufficient width to contact with at the same time, a number of commutator segments corresponding to the number of pairs of rings, all co-acting as described for the purpose specified.

11. In a commutator, the combination of the central shaft; pairs of rings, $e$, $n$, each pair of which is independently connected and each ring of which is insulated from each other; segment pieces, $I'$, $I^2$, &c., connected successively and alternately in series with said rings, there being a segment or greater number of segments for each ring, and connected alternately and successively in series therewith; brushes to rest on said rings and brushes to rest on the segments, $I'$, $I^2$, &c., equal in width to the width of the segments; and suitable connections to said brushes to commutate or deliver the current either from the rings or segments or both, as desired, for the purpose specified.

12. In a commutator, the combination of the central shaft; pairs of rings, $e$, $n$, each pair of which is independently connected and each ring of which is insulated from each other, the rings of each pair being for opposite poles of an electric circuit; segment pieces, $I'$, $I^2$, &c., connected successively and alternately in the series with said rings, there being an equal number of segments for each ring; brushes to rest on said segments, $I'$, $I^2$, &c., of an equal width with the segments of said commutator; and suitable connections to said brushes to commutate and deliver a current either from the rings through the segment or vice versa, as desired, for the purpose specified.

13. In a commutator, the combination of conductor members in pairs, each pair of which is independently connected and each member of which is insulated from the other, a member of each pair permanently connected in opposite ends of an electric circuit; an equal number of commutator sections connected with each member alternately and successively; brushes of sufficient width to rest upon two of the commutator segments and consequently will always rest upon at least one segment for traversing the commutator sections to commutate the current continuously, as desired.

In witness whereof I have hereunto set my hand and seal in the presence of two witnesses.

HENRY P. WHITE. [L. S.]

Witnesses:
WALTER S. WOOD,
MARIAN I. LONGYEAR.